US011831883B2

United States Patent
Li et al.

(10) Patent No.: US 11,831,883 B2
(45) Date of Patent: Nov. 28, 2023

(54) QOE-BASED ADAPTIVE ACQUISITION AND TRANSMISSION METHOD FOR VR VIDEO

(71) Applicant: HEFEI UNIVERSITY OF TECHNOLOGY, Hefei (CN)

(72) Inventors: Jie Li, Hefei (CN); Cong Zhang, Hefei (CN); Ling Han, Hefei (CN); Zhi Liu, Hefei (CN); Qiyue Li, Hefei (CN); Ransheng Feng, Hefei (CN)

(73) Assignee: HEFEI UNIVERSITY OF TECHNOLOGY, Hefei (CN)

( * ) Notice: Subject to any disclaimer, the term of this patent is extended or adjusted under 35 U.S.C. 154(b) by 253 days.

(21) Appl. No.: 17/481,211

(22) Filed: Sep. 21, 2021

(65) Prior Publication Data

US 2022/0006851 A1  Jan. 6, 2022

Related U.S. Application Data

(63) Continuation of application No. PCT/CN2019/097101, filed on Jul. 22, 2019.

(30) Foreign Application Priority Data

Jun. 28, 2019  (CN) .......................... 201910579018.4

(51) Int. Cl.
*H04N 19/176* (2014.01)
*H04N 19/166* (2014.01)

(52) U.S. Cl.
CPC ......... *H04N 19/176* (2014.11); *H04N 19/166* (2014.11)

(58) Field of Classification Search
None
See application file for complete search history.

(56) References Cited

U.S. PATENT DOCUMENTS 9,756,142 B2  9/2017  Dey et al.
2012/0117225 A1  5/2012  Kordasiewicz
(Continued)

FOREIGN PATENT DOCUMENTS

CN  101222296 A  7/2008
CN  102484748 A  5/2012
(Continued)

OTHER PUBLICATIONS

International Search Report for PCT/CN2019/097101.
(Continued)

*Primary Examiner* — Anh Nguyen
(74) *Attorney, Agent, or Firm* — J.C. PATENTS

(57) ABSTRACT

The present application discloses a QoE-based adaptive acquisition and transmission method for VR video, comprising the following steps: 1, capturing, by respective cameras in a VR video acquisition system, original videos with the same bit rate level, and compressing each original video with different bit rate levels; 2, selecting, by a server, a bit rate level for each original video for transmission, and synthesizing all of the transmitted original videos into a complete VR video; 3, performing, by the server, a segmentation process on the synthesized VR video, and compressing each video block into different quality levels; and 4, selecting, by the server, a quality level and an MCS scheme for each video block according to real-time viewing angle information of users and downlink channel bandwidth information in a feedback channel, and transmitting each video block to a client.

3 Claims, 2 Drawing Sheets

(56) References Cited

U.S. PATENT DOCUMENTS

| | | | |
|---|---|---|---|
| 2014/0282792 A1 | 9/2014 | Bao et al. | |
| 2018/0309991 A1* | 10/2018 | Thiagarajan | ......... H04N 19/625 |
| 2019/0068473 A1 | 2/2019 | Vu | |
| 2019/0246104 A1* | 8/2019 | Liu | ...................... H04N 19/164 |

FOREIGN PATENT DOCUMENTS

| | | | |
|---|---|---|---|
| CN | 103581696 A | | 2/2014 |
| CN | 103888846 A | | 6/2014 |
| CN | 104869651 A | | 8/2015 |
| CN | 105872540 A | | 8/2016 |
| CN | 107529064 A | | 12/2017 |
| CN | 107995493 A | | 5/2018 |
| CN | 108235131 A | | 6/2018 |
| CN | 108769755 A | * | 11/2018 |
| CN | 108769755 A | | 11/2018 |
| EP | 2443831 A1 | | 4/2012 |

OTHER PUBLICATIONS

First Office Action of the priority CN application.
Notice of Allowance of the priority CN application.
NPL: "Joint uplink-downlink carrier aggregation scheme in LTE-A", 2016 IEEE 21st, International Workshop on Computer Aided Modelling and Design of Communication Links and Networks (CAMAD), Dec. 22, 2016.

\* cited by examiner

QOE-BASED ADAPTIVE ACQUISITION AND TRANSMISSION METHOD FOR VR VIDEO

CROSS-REFERENCE TO RELATED APPLICATION

This application is a continuation of International Application No. PCT/CN2019/097101, filed on Jul. 22, 2019, which claims priority to Chinese Patent Application No. 201910579018.4, filed on Jun. 28, 2019. Both of the above applications are hereby incorporated by reference in their entireties.

TECHNICAL FIELD

The present disclosure relates to a field of multimedia video transmission, in particular to an adaptive acquisition and transmission method for streaming media of VR video.

BACKGROUND

Jiangtao Luo et al. from Chongqing University of Posts and Telecommunications invent a DASH-based adaptive transmission method for VR video (publication number: CN108235131A). The method includes: establishing a mapping relationship model between a three-dimensional VR video and a two-dimensional plane VR video; dividing the VR video in regional priority based on human vision and motion characteristics; slicing the VR video at a server; predicting available bandwidth using a Kalman filter algorithm by a bandwidth estimation module at a client; smoothing the available bandwidth based on a state of a buffer by a video buffer module at the client; predicting a user view window based on a motion inertia by a user view window perception module at the client; transmitting the VR video adaptively on a comprehensive consideration of the user view window, the network environment and buffer status by a decision module at the client. However, in this method, a role of quality of experience (QoE) in VR video transmission is not taken into account, an indicator for QoE of a user during a transmission process is missed, and a change in the user experience during the transmission process cannot be reflected.

Zesong Fei et al. of Beijing Institute of Technology invent an adaptive encoding method based on VR terminal feedback (publication number: CN107529064A). The idea of the method lies in: improving the transmitting mechanism, which is dividing the VR video into a plurality of videos of viewing angle, where information about each video of viewing angle is encoded and transmitted independently; transmitting the information about video of viewing angle required by an user in real time according to a terminal viewing angle tracking technology, and transmitting other viewing angles at a low bit rate; splicing respective videos of viewing angle into a VR video at the terminal; enabling the user to obtain an appropriate viewing angle information with a terminal scoring feedback mechanism; transmitting a scoring instruction of user to the server; and feedbacking different code rates mapped according to a scoring of user to the terminal by the server. Although the said method takes into account the feedback effect of the viewing angle of the terminal on VR video transmission, it ignores a guiding effect of QoE during a transmission process and cannot improve a user experience during the transmission process.

Yuanyuan Xu et al. of Hohai University invent a method for encoding VR video with multiple descriptions (publication number: CN107995493A). The steps are as follows: (1) dividing a VR video into multiple spatial segments according to a size of a viewing angle of a device at a receiving end; 2) selecting and encoding a spatial segment containing an interested area of a user, performing segment interleaving, and generating two corresponding descriptions, which are transmitted in the network independently; (3) decoding, respectively, according to different situations where a single description is received or two descriptions are received at the same time, at the receiving end. Although the said method embodies a priority transmission of the user's interested area, it only considers a downlink transmission process in a VR video transmission process, and does not consider an uplink transmission process. Such an independent optimization will reduce an overall performance of an entire transmission system.

Wei Xiong et al. from Hubei University of Technology invent a system and method for high-resolution VR video live broadcasting photo taking (publication number: CN108769755A). The system including: an image acquisition module, a streaming media server module, and a user terminal module, where the image acquisition module includes image acquisition device and a first transmitting module; the streaming media server module includes a processing module, a storage module, and a second transmitting module; the processing module includes a real-time splicing unit, a video encoding unit, and a photo taking processing unit; the storage module includes a storage unit a, a storage unit b, and a storage unit c: the user terminal module includes at least one user device, and each user device includes a display module, a user interaction module, and a third transmitting module. Although the said method takes into account an uplink transmission and a downlink transmission process of VR video live broadcasting, it does not take into account an importance of QoE in a VR video system, and fails to improve a user's quality of experience during a transmitting process.

SUMMARY

In order to avoid the disadvantages in the above-mentioned prior art, the present disclosure provides a QoE-based adaptive acquisition and transmission method for VR video, so as to better improve resource utilization rate and increase quality of experiences QoEs of multiple users under a condition of limited bandwidth.

The present disclosure adopts the following technical solutions to solve the technical problems:

a QoE-based adaptive acquisition and transmission method for VR video of the present disclosure is applied in a network environment including C cameras, a VR video server and N clients; a transmission between the cameras and the VR video server being performed through an uplink, a transmission between the VR video server and the clients through a downlink; the downlink including a feedback channel from the clients to the VR video server; where the adaptive acquisition and transmission method for VR video is conducted as follows:

step 1, denoting C original videos taken by C cameras as $\{V_1, V_2, \ldots, V_c, \ldots, V_C\}$ in the network environment, where $V_c$ represents an original video taken by a c-th camera, where $1 \leq c \leq C$;

compressing the c-th original video $V_c$ into original videos with E bit rate levels, denoted as $\{V_c^1, V_c^2, \ldots, V_c^e, \ldots, V_c^E\}$, where $V_c^e$ represents an original video with e-th bit rate level obtained after compressing the c-th original $V_c$, video where $1 \leq e \leq E$;

step 2, establishing an objective function with a goal of maximizing a total utility value constituted with a sum of quality of experiences QoEs of N clients, and setting corresponding constraint conditions, thereby establishing an adaptive acquisition and transmission model for VR video;

step 3, solving the adaptive acquisition and transmission model for VR video with a KKT condition and a hybrid branch and bound method to obtain an uplink collecting decision variable and a downlink transmitting decision variable in the network environment;

step 4, selecting, by the VR video server, an original video with the e-th bit rate level for the c-th camera according to a value of the uplink collecting decision variable $\chi_{c,e}^{UL}$, and receiving the original video of the e-th bit rate level selected by the c-th camera uploaded through the uplink, so that the VR video server receives original videos of corresponding bit rate levels selected by C cameras respectively;

step 5, performing, by the VR video server, a stitching and mapping process on the original videos with C corresponding bit rate levels to synthesize a complete VR video;

step 6, performing, by the VR video server, a segmentation process on the complete VR video to obtain T video blocks, denoted as $\{T_1, T_2, \ldots, T_t, \ldots, T_T\}$, where $T_t$ represents any t-th video block, and $1 \leq t \leq T$;

where the VR video server provides D bit rate selections for the t-th video block $T_t$ for a compressing process, thereby obtaining compressed video blocks with D different bit rate levels, denoted as $\{T_t^1, T_t^2, \ldots, T_t^d, \ldots, T_t^D\}$, $T_t^d$ represents a compressed video block with the d-th bit rate level obtained after the t-th video block $T_t$ is compressed, where $1 \leq d \leq D$;

step 7, assuming that a modulation and coding scheme in the network environment is $\{M_1, M_2, \ldots, M_m, \ldots, M_M\}$, where $M_m$ represents an m-th modulation and coding scheme, and $1 \leq m \leq M$; selecting, by the VR video server, the m-th modulation and coding scheme for the t-th video block $T_t$; and selecting, by the VR video server, the compressed video block $T_t^d$ with the d-th bit rate level of the t-th video block $T_t$ for any n-th client according to a value of the downlink transmitting decision variable $\chi_{t,d,m}^{DL}$, and transmitting the selected compressed video block $T_t^d$ with the d-th bit rate level of the t-th video block $T_t$ to the n-th client through the downlink with the m-th modulation and coding scheme; so that the n-th client receives compressed video blocks with corresponding bit rate levels of T video blocks through the corresponding modulation and coding scheme;

step 8, performing, by the n-th client, decoding, mapping, and rendering process on the received compressed video blocks with corresponding bit rate levels of the T video blocks, so as to synthesize a QoE-optimized VR video.

The adaptive acquisition and transmission method for VR video of the present disclosure is characterized in that the step 2 is performed as follows:

step 2.1, establishing the objective function with formula (1):

$$\mathrm{Max} \sum_{n=1}^{N} QoE = \sum_{n=1}^{N} \log \left( \frac{\sum_{t=1}^{T_{FoV}^n} \sum_{d=1}^{D} \sum_{m=1}^{M} \lambda_{t,d}^{DL} \cdot \chi_{t,d,m}^{DL}}{\lambda_{t,D}^{DL}} \right) \quad (1)$$

formula (1) represents the sum of QoEs of N clients, which is the total value utility of the system; in formula (1), $\lambda_{t,d}^{DL}$ represents a bit rate of the video block t with a quality level of d; $\lambda_{t,D}^{DL}$ represents a bit rate when the video block t is transmitted at a highest quality level D; $T_{FoV}^n$ indicates the video block covered in an FoV of the n-th client; when $\chi_{t,d,m}^{DL}=1$, it means that the t-th video block is transmitted to the client through the downlink at the d-th bit rate level and the m-th modulation and coding scheme; and when $\chi_{t,d,m}^{DL}=0$, it means that the t-th video block is not transmitted to the client through the downlink at the d-th bit rate level and the m-th modulation and coding scheme;

step 2.2, establishing constraint conditions with formulas (2)-(7):

$$\sum_{e=1}^{E} \chi_{c,e}^{UL} = 1, \forall c \quad (2)$$

$$\sum_{c=1}^{C} \sum_{e=1}^{E} \chi_{c,e}^{UL} \cdot \lambda_{c,e}^{UL} \leq BW^{UL} \quad (3)$$

$$\sum_{m=1}^{M} \chi_{t,d,m}^{DL} = 1, \forall t, d \quad (4)$$

$$\sum_{d=1}^{D} \chi_{t,d,m}^{DL} = 1, \forall t, m \quad (5)$$

$$\sum_{t=1}^{T_{FoV}^n} \sum_{d=1}^{D} \sum_{m=1}^{M} \chi_{t,d,m}^{DL} \cdot \left[ \frac{\lambda_{t,d}^{DL}}{R_m^{DL}} \right] \leq Y^{DL} \quad (6)$$

$$\sum_{d=1}^{D} \sum_{m=1}^{M} \chi_{t,d,m}^{DL} \cdot \lambda_{t,d}^{DL} \leq \frac{1}{T} \cdot \sum_{e=1}^{E} \chi_{c,e}^{UL} \cdot \lambda_{c,t}^{UL}, \forall c, t \quad (7)$$

where formula (2) means that any c-th camera can select an original video of only one bit rate level to upload to the server; in formula (2), when $\chi_{c,e}^{UL}=1$, it means that the c-th camera uploads an original video at e-th bit rate level to the server, and when $\chi_{c,e}^{UL}=0$, it means that the c-th camera does not uploads an original video at e-th bit rate level to the server;

formula (3) indicates that the total bit rate of the transmitted C videos should not exceed a total bandwidth of the entire uplink channel; in formula (3), $BW^{UL}$ represents a value of the total bandwidth of the uplink channel;

formula (4) indicates that when any t-th video block is transmitted to the client through the downlink at d quality level, only one modulation and coding scheme can be selected;

formula (5) indicates that when any t-th video block is transmitted to the client through the downlink with the m-th modulation and coding scheme, the transmitted video block can select only one bit rate level;

formula (6) indicates that a total bit rate of all video blocks transmitted does not exceed a bit rate that all resource blocks in the entire downlink channel can provide; in formula (6), $R_m^{DL}$ indicates a bit rate that can be provided by single resource block when the m-th modulation and coding scheme is selected, $Y^{DL}$ represents a total number of all resource blocks in the downlink channel;

formula (7) indicates that a bit rate of any t-th video block in the downlink of the network environment is not greater than a bit rate of an original video taken by any c-th camera in the uplink.

The step 3 is conducted as follows:

step 3.1, performing a relaxation operation on the collecting decision variable $\chi_{c,e}^{UL}$ and the transmitting decision variable $\chi_{t,d,m}^{DL}$ of the adaptive acquisition and transmission model for VR video, and obtaining a continuous collecting decision variable and a continuous transmitting decision variable within a scope of [0,1], respectively;

step 3.2, according to the constraint conditions of formula (2)-formula (7), denoting $$\sum_{e=1}^{E} \chi_{c,e}^{UL} - 1$$

as a function $h_1(\chi_{c,e}^{UL})$; denoting $$\sum_{c=1}^{C}\sum_{e=1}^{E} \chi_{c,e}^{UL} \cdot \lambda_{c,e}^{UL} - BW^{UL}$$

as a function $h_2(\chi_{t,d,m}^{DL})$; denoting $$\sum_{d=1}^{D} \chi_{t,d,m}^{DL} - 1$$

as a function $h_3(\chi_{t,d,m}^{DL})$; denoting $$\sum_{c=1}^{C}\sum_{e=1}^{E} \chi_{c,e}^{UL} \cdot \lambda_{c,e}^{UL} - BW^{UL}$$

as a function $g_1(\chi_{c,d}^{DL})$; denoting $$\sum_{t=1}^{T_{FoV}^{n}}\sum_{d=1}^{D}\sum_{m=1}^{M} \chi_{t,d,m}^{DL} \cdot \left[\frac{\lambda_{t,d}^{DL}}{R_m^{DL}}\right] - Y^{DL}$$

as a function $g_2(\chi_{t,d,m}^{DL})$; denoting $$\sum_{d=1}^{D}\sum_{m=1}^{M} \chi_{t,d,m}^{DL} \cdot \lambda_{t,d}^{DL} - \frac{1}{T} \cdot \sum_{e=1}^{D} \chi_{c,e}^{UL} \cdot \lambda_{ce}^{UL}$$

as a function $g_3(\chi_{c,e}^{DL}, \chi_{t,d,m}^{DL})$; and calculating a Lagrangian $L(\lambda_{c,e}^{UL}, \chi_{t,d,m}^{DL}, \lambda, \mu)$ function of a relaxed adaptive acquisition and transmission model for VR video with formula (8) as:

$$L(\lambda_{c,e}^{UL}, \chi_{t,d,m}^{DL}, \lambda, \mu) = -\sum_{n=1}^{N} QoE_n + \lambda_1 h_1(\chi_{c,e}^{DL}) + \lambda_2 h_2(\chi_{t,d,m}^{DL}) + \lambda_3 h_3(\chi_{t,d,m}^{DL}) + \mu_1 g_1(\chi_{c,e}^{DL}) + \mu_2 g_2(\chi_{t,d,m}^{DL}) + \mu_3 g_3(\chi_{c,e}^{DL}, \chi_{t,d,m}^{DL}) \quad (8)$$

in the formula (8), $\lambda$ represents a Lagrangian coefficient of the equality constraint conditions in formulas (2)-(7), $\mu$ represents a Lagrangian coefficient of the inequality constraint conditions in formulas (2)-(7), $\lambda_1$ represents a Lagrangian coefficient of the function $h_1(\chi_{c,e}^{UL})$, $\lambda_2$ represents a Lagrangian coefficient of the function $h_2(\chi_{t,d,m}^{DL})$, $\lambda_3$ is a Lagrangian coefficient of the function $h_3(\chi_{t,d,m}^{DL})$, $\mu_1$ is a Lagrangian coefficient of the function $g_1(\chi_{c,e}^{DL})$, $\mu_2$ is a Lagrangian coefficient of the function $g_2(\chi_{t,d,m}^{DL})$, and $\mu_3$ is a Lagrangian coefficient of the function $g_3(\chi_{c,e}^{DL}, \chi_{t,d,m}^{DL})$, and $QoE_n$ represents quality of experience of the n-th client, and:

$$QoE_n = \log\left(\frac{\sum_{t=1}^{T_{FoV}^{n}}\sum_{d=1}^{D}\sum_{m=1}^{M} \lambda_{t,d}^{DL} \chi_{t,d,m}^{DL}}{\lambda_{t,D}^{DL}}\right) \quad (9)$$

step 3.3, obtaining the KKT conditions of the relaxed adaptive acquisition and transmission model for VR video as shown in formulas (10)-(15) below, according to the Lagrangian function $L(\lambda_{c,e}^{UL}, \chi_{t,d,m}^{DL}, \lambda, \mu)$ of formula (8):

$$\frac{\partial L(\lambda_{c,e}^{UL}, \chi_{t,d,m}^{DL}, \lambda, \mu)}{\partial \lambda_{c,e}^{UL}} = \lambda_1 \frac{\partial h_1(\chi_{c,e}^{DL})}{\partial \lambda_{c,e}^{UL}} + \mu_1 + \mu_3 \frac{\partial g_3(\chi_{c,e}^{DL}, \chi_{t,d,m}^{DL})}{\partial \lambda_{c,e}^{UL}} = 0 \quad (10)$$

$$\frac{\partial L(\lambda_{c,e}^{UL}, \chi_{t,d,m}^{DL}, \lambda, \mu)}{\partial \chi_{t,d,m}^{DL}} = \quad (11)$$

$$-\sum_{n=1}^{N} \frac{\partial QoE_n}{\partial \chi_{t,d,m}^{DL}} + \lambda_2 \frac{\partial h_2(\chi_{t,d,m}^{DL})}{\partial \chi_{t,d,m}^{DL}} + \lambda_3 \frac{\partial h_3(\chi_{t,d,m}^{DL})}{\partial \chi_{t,d,m}^{DL}} + \mu_2 \frac{\partial g_2(\chi_{t,d,m}^{DL})}{\partial \chi_{t,d,m}^{DL}} + \mu_3 \frac{\partial g_3(\chi_{c,e}^{DL}, \chi_{t,d,m}^{DL})}{\partial \chi_{t,d,m}^{DL}} = 0$$

$$g_1(\chi_{c,e}^{DL}) \leq 0, g_2(\chi_{t,d,m}^{DL}) \leq 0, g_3(\chi_{c,e}^{DL}, \chi_{t,d,m}^{DL}) \leq 0 \quad (12)$$

$$h_1(\chi_{c,e}^{DL}) = 0, h_2(\chi_{t,d,m}^{DL}) = 0, h_3(\chi_{t,d,m}^{DL}) = 0 \quad (13)$$

$$\lambda_1, \lambda_2, \lambda_3 \neq 0, \mu_1, \mu_2, \mu_3 \geq 0 \quad (14)$$

$$\mu_1 g_1(\chi_{c,e}^{DL}) = 0, \mu_2 g_2(\chi_{t,d,m}^{DL}) = 0, \mu_3 g_3(\chi_{c,e}^{DL}, \chi_{t,d,m}^{DL}) = 0 \quad (15)$$

solving the formulas (10)-(15), and obtaining an optimal solution $\chi_{relax}$ and an optimal total utility value $Z_{relax}$ of the relaxed adaptive acquisition and transmission model for VR video; where the optimal solution $\chi_{relax}$ includes relaxed optimal solutions of the collecting decision variable $\chi_{c,e}^{UL}$ and the transmitting decision variable $\chi_{t,d,m}^{DL}$;

step 3.4, using the optimal solution $\chi_{relax}$ and the optimal total utility value $Z_{relax}$ as initial input parameters of the hybrid branch and bound method;

step 3.5, defining the number of branches in the hybrid branch and bound method as k, defining a lower bound of the optimal total utility value in the hybrid branch and bound method as L, and defining an upper bound of the optimal total utility value in the hybrid branch and bound method as U;

step 3.6, initializing k=0;
step 3.7, initializing L=0;
step 3.8, initializing U=$Z_{relax}$;
step 3.9, denoting an optimal solution of a k-th branch as $\chi_k$ and denoting a corresponding optimal total utility value as $Z_k$, assigning a value of $\chi_{relax}$ to $\chi_k$, and using the optimal solution $\chi_k$ of the k-th branch as a root node;

step 3.10, determining whether there is a solution of $\chi_k$ that does not meet the 0-1 constraint condition, if there is, dividing a relaxed optimal solution of $\chi_k$ into a solution that meets the 0-1 constraint condition and a solution $\chi_{k(0,1)}$ that does not meet the 0-1 constraint condition, and going to step 3.12; otherwise, expressing $\chi_k$ as the optimal solution of the non-relaxed adaptive acquisition and transmission model for VR video;

step 3.11, generating randomly, a random number $\varepsilon_k$ for the k-th branch within a range of (0,1), and determining whether $0<\chi_{k(0,1)}<\varepsilon_k$ is true; if true, adding the constraint condition "$\chi_{k(0,1)}=0$" to the non-relaxed adaptive acquisition and transmission model for VR video to form a sub-branch I of the k-th branch; otherwise, adding a constraint condition "$\chi_{k(0,1)}=1$" to the non-relaxed adaptive acquisition and transmission model for VR video to form a sub-branch II of the k-th branch;

step 3.12, solving relaxed solutions for the sub-branch I and the sub-branch II of the k-th branch with the KKT condition, and using them as an optimal solution $\chi_{k+1}$ and an optimal total utility value $Z_{k+1}$ to a (k+1)-th branch, where the $\chi_{k+1}$ includes: relaxed solutions of the sub-branch I and the sub-branch II of the (k+1)-th branch;

step 3.13, determining whether the optimal solution $\chi_{k+1}$ of the (k+1)-th branch meets the 0-1 constraint condition, if so, finding a maximum value from the optimal total utility value $Z_{k+1}$ and assigning it to L, where $\chi_{k+1}\in\{0,1\}$; otherwise, finding the maximum value from the optimal total utility value $Z_{k+1}$ and assigning it to U, where $\chi_{k+1}\in(0,1)$ $\chi_{k+1}\in\{0,1\}$;

step 3.14, determining whether $Z_{k+1}<L$ is true; if so, cutting off a branch where the optimal solution $\chi_{k+1}$ of the (k+1)-th branch is located, assigning k+1 to k, and returning to step 3.10; otherwise, going to step 3.15;

step 3.15, determining whether $Z_{k+1}>L$ is true; if so, assigning k+1 to k, and returning to step 3.10; otherwise, going to step 3.16;

step 3.16, determining whether $Z_{k+1}=L$ is true, if so, it means that the optimal solution of the non-relaxed adaptive acquisition and transmission model for VR video is the optimal solution $\chi_{k+1}$ of the (k+1)-th branch, and assigning $\chi_{k+1}$ to an optimal solution $\chi_{0-1}$ of the non-relaxed adaptive acquisition and transmission model for VR video, assigning $Z_{k+1}$ corresponding to the $\chi_{k+1}$ to an optimal total utility value $Z_{0-1}$ of the non-relaxed adaptive acquisition and transmission model for the VR video; otherwise, assigning k+1 to k, and returning to step 3.10.

Compared with the prior art, the beneficial effects of the present disclosure are embodied in:

1. the present disclosure proposes an adaptive acquisition and transmission method for streaming media of VR video in conjunction with the consideration of the uplink and downlink transmission process of the VR video, which is used to optimize the QoEs of multiple users in the transmission process for VR video as a whole, thereby better improving the QoEs of all users in the transmission process for VR video;
2. the present disclosure combines an adaptive transmission for streaming media of VR video with QoEs of multiple users, and proposes a method for optimizing the transmission method for streaming media of VR video with the QoEs of all users in the system as a transmission guiding factor, so as to better guide and optimize the transmission of for streaming media of VR video;
3. the present disclosure solves the proposed adaptive acquisition and transmission model for VR video by applying the KKT conditions and the hybrid branch and bound method, so as to improve an efficiency of the solving process and an accuracy of the solution, thereby improving the high efficiency of the adaptive acquisition and transmission method for VR video.

DESCRIPTION OF EMBODIMENTS

Figure 1:
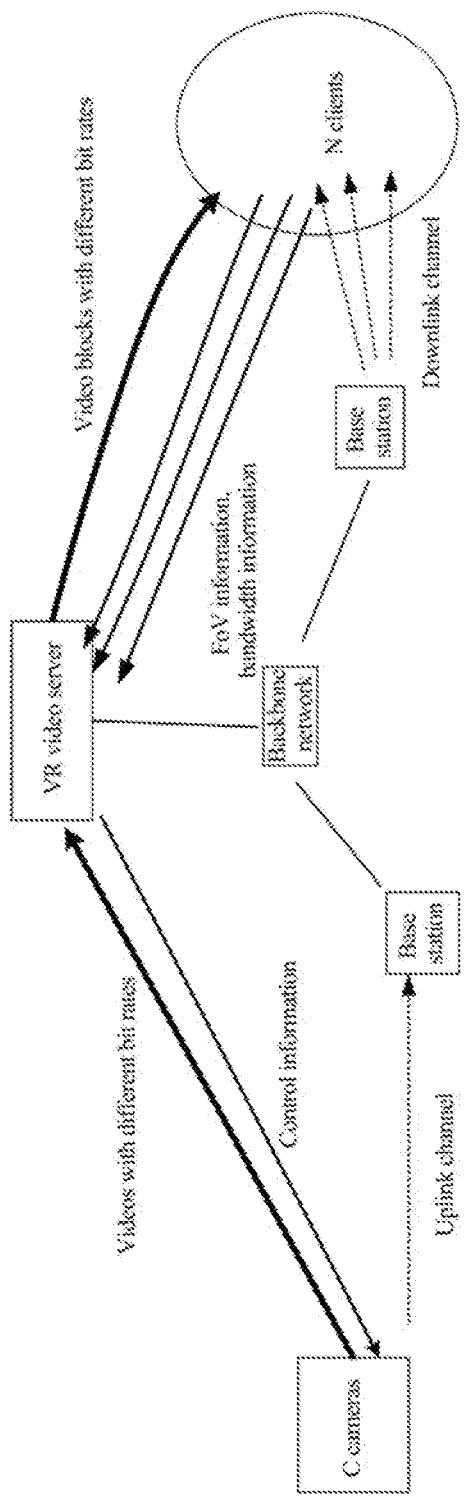
FIG. 1 is an application scenario diagram of an acquisition and transmission method for streaming media of VR video proposed in the present disclosure.
Figure 2:
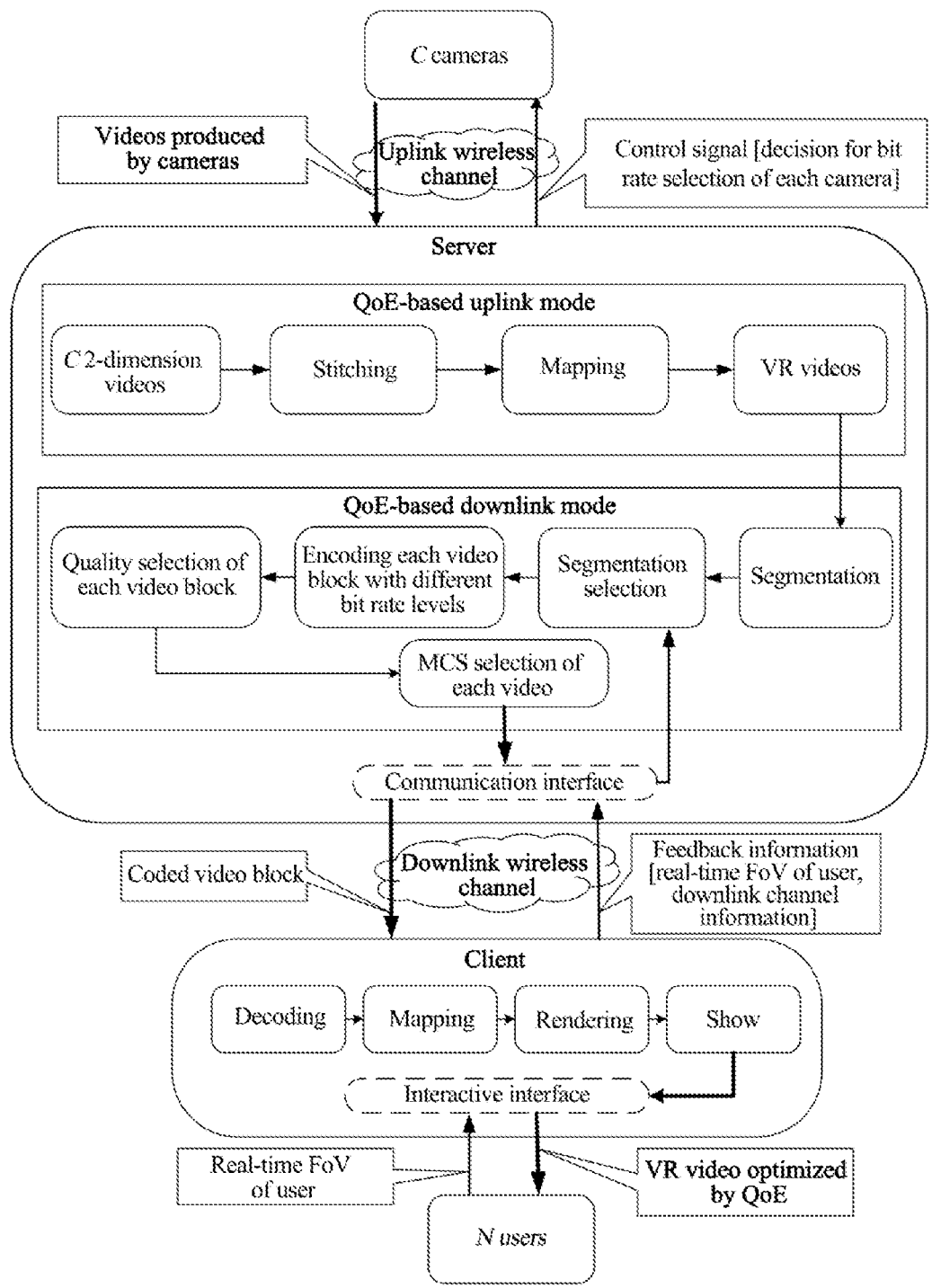
FIG. 2 is a system structure diagram of an adaptive acquisition and transmission method proposed in the present disclosure.

In this embodiment, a QoE-based adaptive acquisition and transmission method for a VR video, as shown in FIG. 1, is applied in a network environment of multiple users, and there are C cameras, a VR video server and N clients in the network environment. The transmission between the cameras and the VR video server is performed through an uplink, and the transmission between the VR video server and the clients is performed through a downlink; the downlink includes a feedback channel from the clients to the VR video server; the feedback channel is able to feedback a real-time viewing angle information of the user and a downlink bandwidth information to the server, assisting the server on acquisition and transmission operation. As shown in FIG. 2, the method specifically includes the following steps:

step 1, denoting C original videos taken by C cameras as $\{V_1, V_2, \ldots, V_c, \ldots, V_C\}$ in an application network environment, where $V_c$ represents an original video taken by a c-th camera, where $1 \leq c \leq C$;

obtaining E original videos with different bit rate levels after compressing the original video $V_c$ taken by the c-th camera, where $V_c^e$ represents an original video with e-th bit rate level obtained after compressing the original video $V_c$ taken by the c-th camera $C_c$, where $1 \leq e \leq E$;

step 2, establishing an objective function with a goal of maximizing a total utility value constituted with a sum of quality of experiences QoEs of N clients, and setting corresponding constraint conditions, thereby establishing an adaptive acquisition and transmission model for VR video with formula (1) formula (7);

The objective function:

$$\text{Max} \sum_{n=1}^{N} QoE = \sum_{n=1}^{N} \log \left( \frac{\sum_{t=1}^{T_{FoV}^n} \sum_{d=1}^{D} \sum_{m=1}^{M} \lambda_{t,d}^{DL} \cdot \chi_{t,d,m}^{DL}}{\lambda_{t,D}^{DL}} \right) \quad (1)$$

formula (1) represents the sum of QoEs of N clients, which is the total utility value of the system; in formula (1), $\lambda_{t,d}^{DL}$ represents a bit rate of a video block t with a quality level of d; $\lambda_{t,D}^{DL}$ represents a bit rate when the video block t is transmitted at a highest quality level D; $T_{FoV}^n$ represents a video block covered in a FoV of a n-th client; when $\chi_{t,d,m}^{DL}=1$, it means that a t-th video block is transmitted to the client through the downlink at a d-th bit rate level and an m-th modulation and coding scheme; and when $\chi_{t,d,m}^{DL}=0$, it means that the t-th video block is not transmitted to the client through the downlink at the d-th bit rate level and the m-th modulation and coding scheme;

The constraint conditions:

$$\sum_{e=1}^{E} \chi_{c,e}^{UL} = 1, \forall c \quad (2)$$

$$\sum_{c=1}^{C} \sum_{e=1}^{E} \lambda_{c,e}^{UL} \cdot \chi_{c,e}^{UL} \leq BW^{UL} \quad (3)$$

-continued $$\sum_{m=1}^{M} \chi_{t,d,m}^{DL} = 1, \forall\, t, d \quad (4)$$

$$\sum_{d=1}^{D} \chi_{t,d,m}^{DL} = 1, \forall\, t, m \quad (5)$$

$$\sum_{t=1}^{T_{FoV}^{n}} \sum_{d=1}^{D} \sum_{m=1}^{M} \chi_{t,d,m}^{DL} \cdot \left\lceil \frac{\lambda_{t,d}^{DL}}{R_{m}^{DL}} \right\rceil \leq Y^{DL} \quad (6)$$

$$\sum_{d=1}^{D} \sum_{m=1}^{M} \chi_{t,d,m}^{DL} \cdot \lambda_{t,d}^{DL} \leq \frac{1}{T} \cdot \sum_{e=1}^{E} \chi_{c,e}^{UL} \cdot \lambda_{c,e}^{UL}, \forall\, c, t \quad (7)$$

formula (2) indicates that any c-th camera can select an original video of only one bit rate level to upload to the server; in formula (2), when $\chi_{c,e}^{UL}=1$, it means that the c-th camera uploads an original video at e-th bit rate level to the server, and when $\chi_{c,e}^{UL}=0$, it means that the c-th camera does not upload an original video at e-th bit rate level to the server;

formula (3) indicates that a total bit rate of the transmitted C videos should not exceed a total bandwidth of the entire uplink channel; in formula (3), $BW^{UL}$ represents a value of the total bandwidth of the uplink channel;

formula (4) indicates that when any t-th video block is transmitted to the client through the downlink at d quality level, only one modulation and coding scheme can be selected;

formula (5) indicates that when any t-th video block is transmitted to the client through the downlink with the m-th modulation and coding scheme, the transmitted video block can select only one bit rate level;

formula (6) indicates that a total bit rate of all video blocks transmitted does not exceed a bit rate that all resource blocks in the entire downlink channel can provide; in formula (6), $R_{m}^{DL}$ indicates a bit rate that can be provided by single resource block when the m-th modulation and coding scheme is selected, $Y^{DL}$ represents a total number of all resource blocks in the downlink channel;

formula (7) indicates that a bit rate of any t-th video block in the downlink of the network environment is not greater than a bit rate of an original video taken by any c-th camera in the uplink.

Step 3, solving the adaptive acquisition and transmission model for VR video with a KKT condition and a hybrid branch and bound method to obtain an uplink collecting decision variable and a downlink transmitting decision variable in the network environment;

step 3.1, performing a relaxation operation on the collecting decision variable $\chi_{c,e}^{UL}$ and the transmitting decision variable $\chi_{t,d,m}^{DL}$ of the adaptive acquisition and transmission model for VR video, and obtaining a continuous collecting decision variable and a continuous transmitting decision variable within a scope of [0,1], respectively;

step 3.2, according to the constraint conditions of formula (2)-formula (7), denoting $$\sum_{e=1}^{E} \chi_{c,e}^{UL} - 1$$

as a function $h_1(\chi_{c,e}^{UL})$; denoting $$\sum_{c=1}^{C} \sum_{e=1}^{E} \chi_{c,e}^{UL} \cdot \lambda_{c,e}^{UL} - BW^{UL}$$

as a function $h_2(\chi_{t,d,m}^{DL})$; denoting $$\sum_{d=1}^{D} \chi_{t,d,m}^{DL} - 1$$

as a function $h_3(\chi_{t,d,m}^{DL})$; denoting $$\sum_{c=1}^{C} \sum_{e=1}^{E} \chi_{c,e}^{UL} \cdot \lambda_{c,e}^{UL} - BW^{UL}$$

as a function $g_1(\chi_{c,d}^{DL})$; denoting $$\sum_{t=1}^{T_{FoV}^{n}} \sum_{d=1}^{D} \sum_{m=1}^{M} \chi_{t,d,m}^{DL} \cdot \left\lceil \frac{\lambda_{t,d}^{DL}}{R_{m}^{DL}} \right\rceil - Y^{DL}$$

as a function $g_2(\chi_{t,d,m}^{DL})$; denoting $$\sum_{d=1}^{D} \sum_{m=1}^{M} \chi_{t,d,m}^{DL} \cdot \lambda_{t,d}^{DL} - \frac{1}{T} \cdot \sum_{c=1}^{D'} \chi_{c,e}^{UL} \cdot \lambda_{c,e}^{UL}$$

as a function $g_1(\chi_{c,e}^{DL}, \chi_{t,d,m}^{DL})$; and a Lagrangian function $L(\lambda_{c,e}^{UL}, \chi_{t,d,m}^{DL}, \lambda, \mu)$ of a relaxed adaptive acquisition and transmission model for VR video is calculated with formula (8) as:

$$L(\lambda_{c,e}^{UL}, \chi_{t,d,m}^{DL}, \lambda, \mu) = -\sum_{n=1}^{N} QoE_n + \lambda_1 h_1(\chi_{c,e}^{DL}) + \lambda_2 h_2(\chi_{t,d,m}^{DL}) + \lambda_3 h_3(\chi_{t,d,m}^{DL}) + \mu_1 g_1(\chi_{c,e}^{DL}) + \mu_2 g_2(\chi_{t,d,m}^{DL}) + \mu_3 g_3(\chi_{c,e}^{DL}, \chi_{t,d,m}^{DL}) \quad (8)$$

in the formula (8), $\lambda$ represents a Lagrangian coefficient of equality constraint conditions in formulas (2)-(7), $\mu$ represents a Lagrangian coefficient of inequality constraint conditions in formulas (2)-(7), $\lambda_1$ represents a Lagrangian coefficient of the function $h_1(\chi_{c,e}^{UL})$, $\lambda_2$ represents a Lagrangian coefficient of the function $h_2(\chi_{t,d,m}^{DL})$; $\lambda_3$ is a Lagrangian coefficient of the function $h_3(\chi_{t,d,m}^{DL})$, $\mu_1$ is a Lagrangian coefficient of the function $g_1(\chi_{c,e}^{DL})$, $\mu_2$ is a Lagrangian coefficient of the function $g_2(\chi_{t,d,m}^{DL})$, and $\mu_3$ is a Lagrangian coefficient of the function $g_1(\chi_{c,e}^{DL}, \chi_{t,d,m}^{DL})$, and $QoE_n$ represents quality of experience of the n-th client, and:

$$QoE_n = \log\left(\frac{\sum_{t=1}^{T_{FoV}^{n}} \sum_{d=1}^{D} \sum_{m=1}^{M} \lambda_{t,d}^{DL} \cdot \chi_{t,d,m}^{DL}}{\lambda_{t,D}^{DL}}\right) \quad (9)$$

step 3.3, obtaining the KKT conditions of the relaxed adaptive acquisition and transmission model for VR video as shown in formulas (10)-(15) below according to the Lagrangian function $L(\lambda_{c,e}^{UL}, \chi_{t,d,m}^{DL}, \lambda, \mu)$ of formula (8):

$$\frac{\partial L(\lambda_{c,e}^{UL}, \chi_{t,d,m}^{DL}, \lambda, \mu)}{\partial \lambda_{c,e}^{UL}} = \lambda_1 \frac{\partial h_1(\chi_{c,e}^{DL})}{\partial \lambda_{c,e}^{UL}} + \mu_1 + \mu_3 \frac{\partial g_3(\chi_{c,e}^{DL}, \chi_{t,d,m}^{DL})}{\partial \lambda_{c,e}^{UL}} = 0 \quad (10)$$

$$\frac{\partial L(\lambda_{c,e}^{UL}, \chi_{t,d,m}^{DL}, \lambda, \mu)}{\partial \chi_{t,d,m}^{DL}} = \quad (11)$$

$$-\sum_{n=1}^{N} \frac{\partial QoE_n}{\partial \chi_{t,d,m}^{DL}} + \lambda_2 \frac{\partial h_2(\chi_{t,d,m}^{DL})}{\partial \chi_{t,d,m}^{DL}} + \lambda_3 \frac{\partial h_3(\chi_{t,d,m}^{DL})}{\partial \chi_{t,d,m}^{DL}} +$$

$$\mu_2 \frac{\partial g_2(\chi_{t,d,m}^{DL})}{\partial \chi_{t,d,m}^{DL}} + \mu_3 \frac{\partial g_3(\chi_{c,e}^{DL}, \chi_{t,d,m}^{DL})}{\partial \chi_{t,d,m}^{DL}} = 0$$

$$g_1(\chi_{c,e}^{DL}) \leq 0, g_2(\chi_{t,d,m}^{DL}) = 0, g_3(\chi_{c,e}^{DL}, \chi_{t,d,m}^{DL}) \leq 0 \quad (12)$$

$$h_1(\chi_{c,e}^{DL}) = 0, h_2(\chi_{t,d,m}^{DL}) = 0, h_3(\chi_{c,e}^{DL}) = 0 \quad (13)$$

$$\lambda_1, \lambda_2, \lambda_3 \neq 0, \mu_1, \mu_2, \mu_3 \geq 0 \quad (14)$$

$$\mu_1 g_1(\chi_{c,e}^{DL}) = 0, \mu_2 g_2(\chi_{t,d,m}^{DL}) = 0, \mu_3 g_3(\chi_{c,e}^{DL}, \chi_{t,d,m}^{DL}) = 0 \quad (15)$$

Formulas (10) and (11) represent necessary conditions when an extreme value of the Lagrangian function $L(\lambda_{c,e}^{UL}, \chi_{t,d,m}^{DL}, \lambda, \mu)$ is taken; formulas (12) and (13) represent constraint conditions of the functions $h_1(\chi_{c,e}^{UL})$, $h_2(\chi_{t,d,m}^{DL})$, $h_3(\chi_{t,d,m}^{DL})$, $g_1(\chi_{c,e}^{DL})$, $g_2(\chi_{t,d,m}^{DL})$, $g_3(\chi_{c,e}^{DL}, \chi_{t,d,m}^{DL})$; formula (14) represents constraint conditions of the Lagrangian coefficients $\lambda_1, \lambda_2, \lambda_3, \mu_1, \mu_2, \mu_3$; and formula (15) represents a complementary relaxation condition.

Solving the formulas (10)-(15), and obtaining an optimal solution $\chi_{relax}$ and an optimal total utility value $Z_{relax}$ of the relaxed adaptive acquisition and transmission model for VR video; where the optimal solution $\chi_{relax}$ includes relaxed optimal solutions of the collecting decision variable $\chi_{c,e}^{UL}$ and the transmitting decision variable $\chi_{t,d,m}^{DL}$;

step 3.4, using the optimal solution $\chi_{relax}$ and the optimal total utility value $Z_{relax}$ as initial input parameters of the hybrid branch and bound method;

step 3.5, defining the number of branches in the algorithm as k, defining a lower bound of the optimal total utility value in the algorithm as L, and defining an upper bound of the optimal total utility value of in the algorithm as U;

determining an output parameter of the hybrid branch and bound method:

let $\chi_{0-1}$ denote an optimal solution of a non-relaxed adaptive acquisition and transmission model for VR video;

let $Z_{0-1}$ denote an optimal total utility value of the non-relaxed adaptive acquisition and transmission model for VR video;

step 3.6, initializing k=0;
step 3.7, initializing L=0;
step 3.8, initializing $U=Z_{relax}$;
step 3.9, denoting an optimal solution of the k-th branch as $\chi_k$ and denoting a corresponding optimal total utility value as $Z_k$, assigning a value of $\chi_{relax}$ to $\chi_k$, and using the optimal solution $\chi_k$ of the k-th branch as a root node;

step 3.10, determining whether there is a solution of $\chi_k$ that does not meet a 0-1 constraint condition, if there is, dividing a relaxed optimal solution of $\chi_k$ into a solution that meets the 0-1 constraint condition and a solution $\chi_{k(0,1)}$ that does not meet the 0-1 constraint condition, and going to step 3.12; otherwise, expressing $\chi_k$ as the optimal solution of the non-relaxed adaptive acquisition and transmission model for VR video;

step 3.11, generating randomly, a random number $\varepsilon_k$ for the k-th branch within the range of (0,1), and determining whether $0<\chi_{k(0,1)}<\varepsilon_k$ is true; if true, adding the constraint condition "$\chi_{k(0,1)}=0$" to the non-relaxed adaptive acquisition and transmission model for VR video to form a sub-branch I of the k-th branch; otherwise, adding a constraint condition "$\chi_{k(0,1)}=1$" to the non-relaxed adaptive acquisition and transmission model for VR video to form a sub-branch II of the k-th branch;

step 3.12, solving the relaxed solutions of the sub-branch I and the sub-branch II of the k-th branch with the KKT condition, and using them as an optimal solution $\chi_{k+1}$ and an optimal total utility value $Z_{k+1}$ to the (k+1)-th branch, where the $\chi_{k+1}$ includes: relaxed solutions of the sub-branch I and the sub-branch II of the (k+1)-th branch;

step 3.13, determining whether the optimal solution $\chi_{k+1}$ of the (k+1)-th branch meets the 0-1 constraint condition, if so, finding a maximum value from the optimal total utility value $Z_{k+1}$ and assigning it to L, and $\chi_{k+1} \in \{0,1\}$; otherwise, finding the maximum value from the optimal total utility value $Z_{k+1}$ and assigning it to U, and $\chi_{k+1} \in (0,1)$;

step 3.14, determining whether $Z_{k+1}<L$ is true; if so, cutting off the branch where the optimal solution $\chi_{k+1}$ of the (k+1)-th branch is located, assigning k+1 to k, and returning to step 3.10; otherwise, going to step 3.15;

step 3.15, determining whether $Z_{k+1}>L$ is true; if so, assigning k+1 to k, and returning to step 3.10; otherwise, going to step 3.16;

step 3.16, determining whether $Z_{k+1}=L$ is true, if so, it means that the optimal solution of the non-relaxed adaptive acquisition and transmission model for VR video is the optimal solution $\chi_{k+1}$ of the (k+1)-th branch, and assigning $\chi_{k+1}$ to an optimal solution $\chi_{0-1}$ of the non-relaxed adaptive acquisition and transmission model for VR video, assigning $Z_{k+1}$ corresponding to the $\chi_{k+1}$ to an optimal total utility value $Z_{0-1}$ of the non-relaxed adaptive acquisition and transmission model for the VR video; otherwise, assigning k+1 to k, and returning to step 3.10.

step 4, selecting, by the VR video server, an original video with the e-th bit rate level for the c-th camera according to the value of the uplink collecting decision variable $\chi_{c,e}^{UL}$, and receiving the original video of the e-th bit rate level selected by the c-th camera uploaded through the uplink, so that the VR video server receives original videos of corresponding bit rate levels selected by C cameras respectively;

step 5, performing, by the VR video server, a stitching and mapping process on the original videos with C corresponding bit rate levels to synthesize a complete VR video;

step 6, performing, by the VR video server, a segmentation process on the complete VR video to obtain T video blocks, denoted as $\{T_1, T_2, \ldots, T_t, \ldots, T_T\}$, where $T_t$ represents any t-th video block, and $1 \leq t \leq T$;

the VR video server provides D bit rate selections for the t-th video block $T_t$ for a compressing process, thereby obtaining compressed video blocks with D different bit rate levels, denoted as $\{T_t^1, T_t^2, \ldots, T_t^d, \ldots, T_t^D\}$, where $T_t^d$ represents a compressed video block with the d-th bit rate level obtained after the t-th video block $T_t$ is compressed, where $1 \leq d \leq D$;

step 7, assuming that a modulation and coding scheme in the network environment is $\{M_1, M_2, \ldots, M_m, \ldots, M_M\}$, where $M_m$ represents the m-th modulation and coding scheme, and 1≤m≤M; and selecting, by the VR video server, the m-th modulation and coding scheme for the t-th video block $T_t$; and selecting, by the VR video server, the compressed video block $T_t^d$ with the d-th bit rate level of the t-th video block $T_t$ for any n-th client according to a value of the downlink transmitting decision variable $\chi_{t,d,m}^{DL}$, and transmitting the selected compressed video block $T_t^d$ with the d-th bit rate level of the t-th video block $T_t$ to the n-th client through the downlink with the m-th modulation and coding scheme; so that the n-th client receives compressed video blocks with corresponding bit rate levels of T video blocks through the corresponding modulation and coding scheme;

step 8, performing, by the n-th client, decoding, mapping, and rendering process on the received compressed video blocks with corresponding bit rate levels of T video blocks, so as to synthesize a QoE-optimized VR video.

The invention claimed is:

1. A Quality of Experience (QoE)-based adaptive acquisition and transmission method for Virtual Reality (VR) video, applied in a network environment comprising C cameras, a VR video server and N clients; a transmission between the cameras and the VR video server being performed through an uplink, a transmission between the VR video server and the clients being performed through a downlink; and the downlink comprising a feedback channel from the clients to the VR video server; wherein the adaptive acquisition and transmission method for the VR video is conducted as follows:

step 1, denoting C original videos taken by the C cameras as $\{V_1, V_2, \ldots, V_c, \ldots, V_C\}$ in the network environment, wherein $V_c$ represents an original video taken by a c-th camera, wherein 1≤c≤C;

compressing the c-th original video $V_c$ into original videos with E bit rate levels, denoted as $\{V_c^1, V_c^2, \ldots, V_c^e, \ldots, V_c^E\}$, wherein $V_c^e$ represents an original video with e-th bit rate level obtained after compressing the c-th original video $V_c$, wherein 1≤e≤E;

step 2, establishing an objective function with a goal of maximizing a total utility value constituted with a sum of quality of experiences (QoEs) of the N clients, and setting corresponding constraint conditions, thereby establishing an adaptive acquisition and transmission model for the VR video;

step 3, solving the adaptive acquisition and transmission model for the VR video with a Karush-Kuhn-Tucker (KKT) condition and a hybrid branch and bound method to obtain an uplink collecting decision variable and a downlink transmitting decision variable in the network environment;

step 4, selecting, by the VR video server, an original video with the e-th bit rate level for the c-th camera according to a value of the uplink collecting decision variable $\chi_{c,e}^{UL}$, and receiving the original video of the e-th bit rate level selected by the c-th camera uploaded through the uplink, so that the VR video server receives original videos of corresponding bit rate levels selected by the C cameras respectively;

step 5, performing, by the VR video server, a stitching and mapping process on the original videos with the corresponding bit rate levels to synthesize a complete VR video which comprises the original videos with the corresponding bit rate levels after the stitching and mapping process;

step 6, performing, by the VR video server, a segmentation process on the complete VR video which comprises the original videos with the corresponding bit rate levels after the stitching and mapping process to obtain T video blocks, denoted as $\{T_1, T_2, \ldots, T_t, \ldots, T_T\}$, wherein $T_t$ represents any t-th video block, and 1≤t≤T;

wherein the VR video server provides D bit rate selections for the t-th video block $T_t$ for a compressing process, thereby obtaining compressed video blocks with D different bit rate levels, denoted as $\{T_t^1, T_t^2, \ldots, T_t^d, \ldots, T_t^D\}$, $T_t^d$ represents a compressed video block with a d-th bit rate level obtained after the t-th video block $T_t$ is compressed, wherein 1≤d≤D;

step 7, assuming that a modulation and coding scheme in the network environment is $\{M_1, M_2, \ldots, M_m, \ldots, M_M\}$, wherein $M_m$ represents an m-th modulation and coding scheme, and 1≤m≤M; and selecting, by the VR video server, the m-th modulation and coding scheme for the t-th video block $T_t$; and selecting, by the VR video server, the compressed video block $T_t^d$ with the d-th bit rate level of the t-th video block $T_t$ for any n-th client according to a value of the downlink transmitting decision variable $\chi_{t,d,m}^{DL}$, and transmitting the selected compressed video block $T_t^d$ with the d-th bit rate level of the t-th video block $T_t$ to the n-th client through the downlink with the m-th modulation and coding scheme; so that the n-th client receives compressed video blocks with corresponding bit rate levels of T video blocks through the corresponding modulation and coding scheme; and step 8, performing, by the n-th client, decoding, mapping, and rendering process on the received compressed video blocks with corresponding bit rate levels of the T video blocks, so as to synthesize a QoE-optimized VR video which comprises the compressed video blocks with corresponding bit rate levels of the T video blocks after the decoding, mapping, and rendering process.

2. The adaptive acquisition and transmission method for the VR video according to claim 1, wherein the step 2 is performed as follows:

step 2.1, establishing the objective function with formula (1):

$$\text{Max} \sum_{n=1}^{N} QoE = \sum_{n=1}^{N} \log\left( \frac{\sum_{t=1}^{T_{FoV}^n} \sum_{d=1}^{D} \sum_{m=1}^{M} \lambda_{t,d}^{DL} \cdot \chi_{t,d,m}^{DL}}{\lambda_{t,D}^{DL}} \right) \quad (1)$$

formula (1) represents the sum of QoEs of the N clients, which is the total utility value of the system; in formula (1), $\lambda_{t,d}^{DL}$ represents a bit rate of the video block t with a quality level of d; $\lambda_{t,D}^{DL}$ represents a bit rate when the video block t is transmitted at a highest quality level D; $T_{FoV}^n$ indicates a video block covered in an FoV of the n-th client; when $\chi_{t,d,m}^{DL}=1$, it means that the t-th video block is transmitted to the n-th client through the downlink at the d-th bit rate level and the m-th modulation and coding scheme; and when $\chi_{t,d,m}^{DL}=0$, it means that the t-th video block is not transmitted to the n-th client through the downlink at the d-th bit rate level and the m-th modulation and coding scheme; and step 2.2, establishing constraint conditions with formulas (2)-(7):

$$\sum_{e=1}^{E} \chi_{c,e}^{UL} - 1, \quad \forall c \quad (2)$$

-continued $$\sum_{c=1}^{C}\sum_{e=1}^{E}\chi_{c,e}^{UL}\cdot\lambda_{c,e}^{UL}\leq BW^{UL} \quad (3)$$

$$\sum_{m=1}^{M}\chi_{t,d,m}^{DL}=1,\quad \forall\, t,d \quad (4)$$

$$\sum_{d=1}^{D}\chi_{t,d,m}^{DL}=1,\quad \forall\, t,m \quad (5)$$

$$\sum_{t=1}^{T_{FoV}^{n}}\sum_{d=1}^{D}\sum_{m=1}^{M}\chi_{t,d,m}^{DL}\cdot\left\lceil\frac{\lambda_{t,d}^{DL}}{R_{m}^{DL}}\right\rceil\leq Y^{DL} \quad (6)$$

$$\sum_{d=1}^{D}\sum_{m=1}^{M}\chi_{t,d,m}^{DL}\cdot\lambda_{t,d}^{DL}\leq \frac{1}{T}\cdot\sum_{e=1}^{E}\chi_{c,e}^{UL}\cdot\lambda_{c,e}^{UL},\quad \forall\, c,t \quad (7)$$

wherein formula (2) means that any c-th camera can select an original video of only one bit rate level to upload to the server; in formula (2), when $\chi_{c,e}^{UL}1$, it means that the c-th camera uploads the original video with the e-th bit rate level to the server, and when $\chi_{c,e}^{UL}=0$, it means that the c-th camera does not upload the original video with the e-th bit rate level to the server;

formula (3) indicates that a total bit rate of the transmitted C original videos selected by the C cameras should not exceed a total bandwidth of an entire uplink channel; in formula (3), $BW^{UL}$ represents a value of the total bandwidth of the uplink channel;

formula (4) indicates that when any t-th video block is transmitted to the client through the downlink at d quality level, only one modulation and coding scheme can be selected;

formula (5) indicates that when any t-th video block is transmitted to the client through the downlink with the m-th modulation and coding scheme, the transmitted video block can select only one bit rate level;

formula (6) indicates that a total bit rate of all video blocks transmitted does not exceed a bit rate that all resource blocks in the entire downlink channel can provide; in formula (6), $R_m^{DL}$ indicates a bit rate that can be provided by single resource block when the m-th modulation and coding scheme is selected, $Y^{DL}$ represents a total number of all resource blocks in the downlink channel;

formula (7) indicates that a bit rate of any t-th video block in the downlink of the network environment is not greater than a bit rate of an original video taken by any c-th camera in the uplink.

3. The adaptive acquisition and transmission method for the VR video according to claim 2, wherein the step 3 is performed as follows:

step 3.1, performing a relaxation operation on the collecting decision variables $\chi_{c,e}^{UL}$ and the transmitting decision variables $\chi_{t,d,m}^{DL}$ of the adaptive acquisition and transmission model for the VR video, and obtaining a continuous collecting decision variable and a continuous transmitting decision variable within a scope of [0,1], respectively;

step 3.2, according to the constraint conditions of formula (2)-formula (7), denoting $$\sum_{e=1}^{E}\chi_{c,e}^{UL}-1$$

as a function $h_1(\chi_{c,e}^{UL})$; denoting $$\sum_{c=1}^{C}\sum_{e=1}^{E}\chi_{c,e}^{UL}\cdot\lambda_{c,e}^{UL}-BW^{UL}$$

as a function $h_2(\chi_{t,d,m}^{DL})$; denoting $$\sum_{d=1}^{D}\chi_{t,d,m}^{DL}-1$$

as a function $h_3(\chi_{t,d,m}^{DL})$; denoting $$\sum_{c=1}^{C}\sum_{e=1}^{E}\chi_{c,e}^{UL}\cdot\lambda_{c,e}^{UL}-BW^{UL}$$

as a function $g_1(\chi_{c,d}^{DL})$; denoting $$\sum_{t=1}^{T_{FoV}^{n}}\sum_{d=1}^{D}\sum_{m=1}^{M}\chi_{t,d,m}^{DL}\cdot\left\lceil\frac{\lambda_{t,d}^{DL}}{R_{m}^{DL}}\right\rceil-Y^{DL}$$

as a function $g_2(\chi_{t,d,m}^{DL})$; denoting $$\sum_{d=1}^{D}\sum_{m=1}^{M}\chi_{t,d,m}^{DL}\cdot\lambda_{t,d}^{DL}-\frac{1}{T}\cdot\sum_{e=1}^{E}\chi_{c,e}^{UL}\cdot\lambda_{c,e}^{UL}$$

as a function $g_3(\chi_{c,e}^{DL},\chi_{t,d,m}^{DL})$; and calculating a Lagrangian function $L(\lambda_{c,e}^{UL},\chi_{t,d,m}^{DL},\lambda,\mu)$ of a relaxed adaptive acquisition and transmission model for the VR video with formula (8) as:

$$L(\lambda_{c,e}^{UL},\chi_{t,d,m}^{DL},\lambda,\mu)=-\sum_{n=1}^{N}QoE_n+\lambda_1 h_1(\chi_{c,e}^{DL})+\lambda_2 h_2(\chi_{t,d,m}^{DL})+ \quad (8)$$
$$\lambda_3 h_3(\chi_{t,d,m}^{DL})+\mu_1 g_1(\chi_{c,e}^{DL})+\mu_2 g_2(\chi_{t,d,m}^{DL})+\mu_3 g_3(\chi_{c,e}^{DL},\chi_{t,d,m}^{DL})$$

in the formula (8), $\lambda$ represents a Lagrangian coefficient of equality constraint conditions in formulas (2)-(7), $\mu$ represents a Lagrangian coefficient of inequality constraint conditions in formulas (2)-(7), $\lambda_1$ represents a Lagrangian coefficient of the function $h_1(\chi_{c,e}^{UL})$, $\lambda_2$ represents a Lagrangian coefficient of the function $h_2(\chi_{t,d,m}^{DL})$, $\lambda_3$ is a Lagrangian coefficient of the function $h_3(\chi_{t,d,m}^{DL})$, $\mu_1$ is a Lagrangian coefficient of the function $g_1(\chi_{c,e}^{DL})$, $\mu_2$ is a Lagrangian coefficient of the function $g_2(\chi_{t,d,m}^{DL})$, and $\mu_3$ is a Lagrangian coefficient of the function $g_3(\chi_{c,e}^{DL},\chi_{t,d,m}^{DL})$, and $QoE_n$ represents quality of experience of the n-th client and:

$$QoE_n = \log\left(\frac{\sum_{t=1}^{T_{FoV}^n} \sum_{d=1}^{D} \sum_{m=1}^{M} \lambda_{t,d}^{DL} \cdot \chi_{t,d,m}^{DL}}{\lambda_{t,D}^{DL}}\right) \quad (9)$$

step 3.3, obtaining the KKT conditions of a relaxed adaptive acquisition and transmission model for the VR video as shown in formulas (10)-(15) below according to the Lagrangian function $L(\lambda_{c,e}^{UL}, \chi_{t,d,m}^{DL}, \lambda, \mu)$ of formula (8):

$$\frac{\partial L(\lambda_{c,e}^{UL} \cdot \chi_{t,d,m}^{DL}, \lambda, \mu)}{\partial \lambda_{c,e}^{UL}} = \lambda_1 \frac{\partial h_1(\chi_{c,e}^{DL})}{\partial \lambda_{c,e}^{UL}} + \mu_1 + \mu_3 \frac{\partial g_3(\chi_{c,e}^{DL} \cdot \chi_{t,d,m}^{DL})}{\partial \lambda_{c,e}^{UL}} = 0 \quad (10)$$

$$\frac{\partial L(\lambda_{c,e}^{UL} \cdot \chi_{t,d,m}^{DL}, \lambda, \mu)}{\partial \chi_{t,d,m}^{DL}} = \quad (11)$$

$$-\sum_{n=1}^{N} \frac{\partial QoE_n}{\partial \chi_{t,d,m}^{DL}} + \lambda_2 \frac{\partial h_2(\chi_{t,d,m}^{DL})}{\partial \chi_{t,d,m}^{DL}} + \lambda_3 \frac{\partial h_3(\chi_{t,d,m}^{DL})}{\partial \chi_{t,d,m}^{DL}} +$$

$$\mu_2 \frac{\partial g_2(\chi_{t,d,m}^{DL})}{\partial \chi_{t,d,m}^{DL}} + \mu_3 \frac{\partial g_3(\chi_{c,e}^{DL}, \chi_{t,d,m}^{DL})}{\partial \chi_{t,d,m}^{DL}} = 0$$

$$g_1(\chi_{c,e}^{DL}) \leq 0, \, g_2(\chi_{t,d,m}^{DL}) \leq 0, \, g_3(\chi_{c,e}^{DL}, \chi_{t,d,m}^{DL}) \leq 0 \quad (12)$$

$$h_1(\chi_{c,e}^{DL}) = 0, \, h_2(\chi_{t,d,m}^{DL}) = 0, \, h_3(\chi_{t,d,m}^{DL}) = 0 \quad (13)$$

$$\lambda_1, \lambda_2, \lambda_3 \neq 0, \, \mu_1, \mu_2, \mu_3 \geq 0 \quad (14)$$

$$\mu_1 g_1(\chi_{c,e}^{DL}) = 0, \, \mu_2 g_2(\chi_{t,d,m}^{DL}) = 0, \, \mu_3 g_3(\chi_{c,e}^{DL}, \chi_{t,d,m}^{DL}) = 0 \quad (15)$$

solving the formulas (10)-(15), and obtaining an optimal solution and an optimal total utility value $Z_{relax}$ of the relaxed adaptive acquisition and transmission model for the VR video; wherein the optimal solution $\chi_{relax}$ comprises relaxed optimal solutions of the collecting decision variable $\chi_{c,e}^{UL}$ and the transmitting decision variable $\chi_{t,d,m}^{DL}$;

step 3.4, using the optimal solution $\chi_{relax}$ and the optimal total utility value $Z_{relax}$ as initial input parameters of the hybrid branch and bound method;

step 3.5, defining the number of branches in the hybrid branch and bound method as k, defining a lower bound of the optimal total utility value in the hybrid branch and bound method as L, and defining an upper bound of the optimal total utility value in the hybrid branch and bound method as U;

step 3.6, initializing k=0;

step 3.7, initializing L=0;

step 3.8, initializing U=$Z_{relax}$;

step 3.9, denoting an optimal solution of a k-th branch as $\chi_k$ and denoting a corresponding optimal total utility value as $Z_k$, assigning a value of $\chi_{relax}$ to $\chi_k$, and using the optimal solution $\chi_k$ of the k-th branch as a root node;

step 3.10, determining whether there is a solution of $\chi_k$ that does not meet a 0-1 constraint condition, if there is, dividing a relaxed optimal solution of $\chi_k$ into a solution that meets the 0-1 constraint condition and a solution $\chi_{k(0,1)}$ that does not meet the 0-1 constraint condition, and going to step 3.12; otherwise, expressing $\chi_k$ as an optimal solution of the non-relaxed adaptive acquisition and transmission model for the VR video;

step 3.11, generating randomly, a random number $\varepsilon_k$ for the k-th branch within a range of (0,1), and determining whether $0 < \chi_{k(0,1)} < \varepsilon_k$ is true; if true, adding a constraint condition "$\chi_{k(0,1)} = 0$" to the non-relaxed adaptive acquisition and transmission model for the VR video to form a sub-branch I of the k-th branch; otherwise, adding a constraint condition "$\chi_{k(0,1)} = 1$" to the non-relaxed adaptive acquisition and transmission model for the VR video to form a sub-branch II of the k-th branch;

step 3.12, solving the relaxed solutions of the sub-branch I and the sub-branch II of the k-th branch with the KKT condition, and using them as an optimal solution $\chi_{k+1}$ and an optimal total utility value $Z_{k+1}$ to a (k+1)-th branch, wherein the $\chi_{k+1}$ comprises: relaxed solutions of the sub-branch I and the sub-branch II of the (k+1)-th branch;

step 3.13, determining whether the optimal solution $\chi_{k+1}$ of the (k+1)-th branch meets the 0-1 constraint condition, if so, finding a maximum value from the optimal total utility value $Z_{k+1}$ and assigning it to L, and $\chi_{k+1} \in \{0,1\}$; otherwise, finding a maximum value from the optimal total value utility $Z_{k+1}$ and assigning it to U, and $\chi_{k+1} \in (0,1)$;

step 3.14, determining whether $Z_{k+1} < L$ is true; if so, cutting off the branch where the optimal solution $\chi_{k+1}$ of the (k+1)-th branch is located, assigning k+1 to k, and returning to step 3.10; otherwise, going to step 3.15;

step 3.15, determining whether $Z_{k+1} > L$ is true; if so, assigning k+1 to k, and returning to step 3.10; otherwise, going to step 3.16; and step 3.16, determining whether $Z_{k+1} = L$ is true, if so, it means that the optimal solution of the non-relaxed adaptive acquisition and transmission model for the VR video is the optimal solution $\chi_{k+1}$ of the (k+1)-th branch, and assigning $\chi_{k+1}$ to an optimal solution $\chi_{0-1}$ of the non-relaxed adaptive acquisition and transmission model for the VR video, assigning $Z_{k+1}$ corresponding to the $\chi_{k+1}$ to an optimal total utility value $Z_{0-1}$ of the non-relaxed adaptive acquisition and transmission model for the VR video; otherwise, assigning k+1 to k, and returning to step 3.10.

\* \* \* \* \*